United States Patent
Chen et al.

(10) Patent No.: US 11,453,739 B2
(45) Date of Patent: Sep. 27, 2022

(54) USE OF THERMALLY DECOMPOSABLE ACID AS INHIBITOR FOR PREPARING POLYISOCYANURATE COMPOSITES

(71) Applicant: Covestro LLC, Pittsburgh, PA (US)

(72) Inventors: Liang Chen, Sewickley, PA (US); James A. Thompson-Colón, Moon Township, PA (US); Alan D. Bushmire, Canonsburg, PA (US)

(73) Assignee: Covestro LLC, Pittsburgh, PA (US)

( * ) Notice: Subject to any disclaimer, the term of this patent is extended or adjusted under 35 U.S.C. 154(b) by 206 days.

(21) Appl. No.: 16/902,668

(22) Filed: Jun. 16, 2020

(65) Prior Publication Data

US 2021/0388148 A1 Dec. 16, 2021

(51) Int. Cl.
| | |
|---|---|
| C08G 18/22 | (2006.01) |
| B29C 70/52 | (2006.01) |
| C08G 18/09 | (2006.01) |
| C08G 18/73 | (2006.01) |
| C08G 18/75 | (2006.01) |
| C08G 18/76 | (2006.01) |
| B29K 75/00 | (2006.01) |
| C08K 3/04 | (2006.01) |
| C08K 3/40 | (2006.01) |
| C08K 7/06 | (2006.01) |
| C08K 7/08 | (2006.01) |
| C08K 7/14 | (2006.01) |

(52) U.S. Cl.
CPC ............ C08G 18/225 (2013.01); B29C 70/52 (2013.01); C08G 18/092 (2013.01); C08G 18/73 (2013.01); C08G 18/758 (2013.01); C08G 18/7657 (2013.01); B29K 2075/00 (2013.01); C08K 3/04 (2013.01); C08K 3/40 (2013.01); C08K 7/06 (2013.01); C08K 7/08 (2013.01); C08K 7/14 (2013.01)

(58) Field of Classification Search
CPC ............................ C08G 18/225; C08G 18/092
See application file for complete search history.

(56) References Cited

U.S. PATENT DOCUMENTS

| | | |
|---|---|---|
| 3,330,828 A | 7/1967 | Grogler et al. |
| 7,202,302 B2 | 4/2007 | Cheolas et al. |
| 9,815,739 B2 | 11/2017 | Zielinski et al. |
| 9,896,571 B2 | 2/2018 | Magnotta et al. |
| 2014/0371406 A1* | 12/2014 | Esbelin ............... C08G 18/4829 525/528 |
| 2015/0158967 A1* | 6/2015 | Esbelin ................ C08G 18/089 252/183.11 |
| 2018/0079855 A1 | 3/2018 | Matner et al. |
| 2018/0086875 A1 | 3/2018 | Achten et al. |
| 2018/0134835 A1 | 5/2018 | Laas et al. |
| 2018/0142056 A1 | 5/2018 | Matner et al. |
| 2018/0162981 A1 | 6/2018 | Achten et al. |
| 2019/0144592 A1 | 5/2019 | Hocke et al. |
| 2019/0144593 A1 | 5/2019 | Hocke et al. |
| 2019/0144596 A1 | 5/2019 | Klimmasch et al. |
| 2019/0144597 A1 | 5/2019 | Achten et al. |
| 2019/0202963 A1 | 7/2019 | Mager et al. |
| 2019/0255788 A1 | 8/2019 | Hocke et al. |

FOREIGN PATENT DOCUMENTS

| | | |
|---|---|---|
| WO | WO 2018073299 A1 | 4/2018 |
| WO | WO 2018073302 A1 | 4/2018 |
| WO | WO 2018073303 A1 | 4/2018 |
| WO | WO 2019197638 A1 | 10/2019 |

* cited by examiner

Primary Examiner — Michael L Leonard
(74) Attorney, Agent, or Firm — Jed C. Benson; John E. Mrozinski, Jr.

(57) ABSTRACT

Provided is a process for producing a polyisocyanurate comprising: trimerizing an aliphatic polyisocyanate with a trimerization catalyst in the presence of a thermally decomposable acid at a molar ratio of acid to catalyst of from 0.1 to 10, wherein the polyisocyanurate has a greater pot life than the pot life of the polyisocyanurate not containing the thermally decomposable acid. Polyisocyanurates made according to the inventive process lengthen the pot life of pultrusion composite formulations made therefrom without affecting the reactivity of the formulations. The pultrusion composite formulations of the invention may be cured and pultruded to yield a variety of products such as wind turbine blades, yacht shells, window frames, door frames, ladder frames, telegraph pole cross arms, tent poles, solar cell frames, solar cell backsheets, radomes, highway guard rails, floor boards, pipes, telegraph poles, auto trunks, luggage holders, engine covers, golf clubs, tennis poles, badminton poles, bicycle frames, surfboards, and snowboards.

18 Claims, No Drawings

USE OF THERMALLY DECOMPOSABLE ACID AS INHIBITOR FOR PREPARING POLYISOCYANURATE COMPOSITES

FIELD OF THE INVENTION

The present invention relates in general to composites, and more specifically, to polyisocyanurate composites made with a thermally decomposable acid which acts as a catalyst inhibitor to increase pot life.

BACKGROUND OF THE INVENTION

The use of fiber reinforced composite materials containing a thermosetting polymer matrix and reinforcing fibers has been growing in the aerospace, automotive, and construction industries, where light weight, excellent mechanical properties, and corrosion resistance are desired. Typical thermosetting polymers are unsaturated polyester, epoxy, and polyurethane. Although composite materials deliver highly differentiated performance, they struggle to achieve long term UV and weathering resistance. They all contain aromatic monomer units that absorb UV light, causing degradation of the polymer matrix. EP 2 777 915 discloses a two-component aliphatic polyurethane system which exhibits good weathering properties in addition to excellent mechanical properties. A thermosetting resin system with long pot life, high thermal stability, and excellent UV and weathering resistance is still lacking.

Polyisocyanurates are known in the art for having good thermal stability and chemical resistance. In particular, polyisocyanurates based on aliphatic isocyanates have very good weathering resistance. However, aliphatic polyisocyanurates have only found practical use as crosslinking agents for polyurethane systems in paint and adhesive applications. U.S. Pat. No. 7,202,302 describes a thermosetting composite system based on polyisocyanurates including a polyol component, an optional chain extender, and an isocyanate. These polyisocyanurate systems have extended initiation times of less than 30 minutes at room temperature and can be snap cured by heat.

U.S. Pat. Pub. 2019/255788 provides a thermoset technology based on aliphatic polyisocyanurates, which are unaffected by UV radiation and have excellent weathering resistance. The liquid resin has improved pot life at room temperature and shows rapid curing at elevated temperatures. These composites are said to be particularly suitable for outdoor applications. This technology has been applied to established composite manufacturing processes such as pultrusion. However, there are still some technical challenges to be addressed, for example, short pot life of <four hours at ambient temperature. It highly desired to improve the formulation pot life while maintaining the resin reactivity.

In WO 2019/197638, a new amine adduct catalyst was developed to address the pot life limitation while still maintaining high reactivity, however, this approach has limited effectiveness with certain polyisocyanates.

Therefore, a need continues to exist in the art for a way to extend the pot life of a polyisocyanurate formulation at room temperature while maintaining curing efficiency.

SUMMARY OF THE INVENTION

Accordingly, the present invention reduces or eliminates problems inherent in the art by providing a new approach to address the pot life limitation of liquid formulations used for preparing polyisocyanurate composites. The present invention extends the pot life of such formulations at room temperature while maintaining the same curing efficiency by introducing a small amount of a thermally decomposable acid. The acid is an organic acid or an acid precursor that is soluble in polyisocyanates and acts as an inhibitor for trimerization catalysts at room temperature. The addition of small amounts of the acid can significantly extend the formulation pot life without affecting resin reactivity. Polyisocyanurates produced in the inventive processes may be used as the matrix material for pultrusion processes to produce a wide variety of products, including but not limited to, wind turbine blades, yacht shells, window frames, door frames, ladder frames, telegraph pole cross arms, tent poles, solar cell frames, solar cell backsheets, radomes, highway guard rails, floor boards, pipes, telegraph poles, auto trunks, luggage holders, engine covers, golf clubs, tennis poles, badminton poles, bicycle frames, surfboards, and snowboards.

These and other advantages and benefits of the present invention will be apparent from the Detailed Description of the Invention herein below.

DETAILED DESCRIPTION OF THE INVENTION

The present invention will now be described for purposes of illustration and not limitation. Except in the operating examples, or where otherwise indicated, all numbers expressing quantities, percentages, and so forth in the specification are to be understood as being modified in all instances by the term "about."

Any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112(a), and 35 U.S.C. § 132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference herein.

Reference throughout this specification to "various non-limiting embodiments," "certain embodiments," or the like, means that a particular feature or characteristic may be included in an embodiment. Thus, use of the phrase "in various non-limiting embodiments," "in certain embodiments," or the like, in this specification does not necessarily refer to a common embodiment, and may refer to different embodiments. Further, the particular features or characteristics may be combined in any suitable manner in one or more embodiments. Thus, the particular features or characteristics illustrated or described in connection with various or certain embodiments may be combined, in whole or in part, with the features or characteristics of one or more other embodiments without limitation. Such modifications and variations are intended to be included within the scope of the present specification.

The grammatical articles "a", "an", and "the", as used herein, are intended to include "at least one" or "one or more", unless otherwise indicated, even if "at least one" or "one or more" is expressly used in certain instances. Thus, these articles are used in this specification to refer to one or more than one (i.e., to "at least one") of the grammatical objects of the article. By way of example, and without limitation, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

The present invention provides a new approach to address the pot life limitation observed in the art with polyisocyanate formulations. The present inventors have surprisingly found that small amounts of acid can significantly extend the formulation pot life while having little or no effect on reactivity.

In a first aspect, the present invention is directed to a process for producing a polyisocyanurate comprising: trimerizing an aliphatic polyisocyanate with a trimerization catalyst in the presence of a thermally decomposable acid at a molar ratio of acid to catalyst of from 0.1 to 10, wherein the polyisocyanurate has a greater pot life than the pot life of the polyisocyanurate not containing the thermally decomposable acid.

In a second aspect, the present invention is directed to one of a coating, an adhesive, a sealant, a film, an elastomer, a casting, a foam, and a composite comprising the cured polyisocyanurate produced according to the previous paragraph In a third aspect, the present invention is directed to a pultrusion composite formulation comprising: a fiber; and a polyisocyanurate formulation, wherein the polyisocyanurate formulation comprises a polyisocyanate composition comprising an aliphatic polyisocyanate which is trimerized with a trimerization catalyst in the presence of a thermally decomposable acid at a molar ratio of acid to catalyst of from 0.1 to 10, and wherein the polyisocyanurate has a greater pot life than the pot life of the polyisocyanurate not containing the thermally decomposable acid.

In a fourth aspect, the present invention is directed to a pultrusion composite, wherein the composite is the reaction product of the formulation according to the previous paragraph, which is pultruded and cured to form the composite. The composite may take a variety of forms, including but not limited to, a wind turbine blade, a yacht shell, a window frame, a door frame, a ladder frame, a telegraph pole cross arm, a tent pole, a solar cell frame, a solar cell backsheet, a radome, a highway guard rail, a floor board, a pipe, a telegraph pole, an auto trunk, a luggage holder, an engine cover, a golf club, a tennis pole, a badminton pole, a bicycle frame, a surfboard, and a snowboard.

The present invention provides a new approach to address the pot life limitations of aliphatic polyisocyanurate formulations. The present invention extends the pot life of formulations at room temperature and maintains the same curing efficiency by introducing a small amount of a thermally decomposable acid. The thermally decomposable acid is an organic acid or an acid precursor that is soluble in polyisocyanates and acts as an inhibitor for trimerization catalysts at room temperature. The addition of small amounts of thermally decomposable acid can significantly extend the formulation pot life without affecting resin reactivity. In various embodiments of the invention, the thermally decomposable may be present at a molar ratio of acid to catalyst of from 0.1 to 10. Polyisocyanurate formulations of the invention have a longer pot life than similar polyisocyanurates formulations not containing a thermally decomposable acid and may be used as the matrix material for pultrusion processes.

As used herein, the term "polymer" encompasses prepolymers, oligomers, and both homopolymers and copolymers; the prefix "poly" in this context refers to two or more. As used herein, the term "molecular weight", when used in reference to a polymer, refers to the number average molecular weight, unless otherwise specified.

As used herein, the term "polyol" refers to compounds comprising at least two free hydroxy groups. Polyols include polymers comprising pendant and terminal hydroxy groups.

As used herein, the term "coating composition" refers to a mixture of chemical components that will cure and form a coating when applied to a substrate.

The terms "adhesive" or "adhesive composition", refers to any substance that can adhere or bond two items together. Implicit in the definition of an "adhesive composition" or "adhesive formulation" is the concept that the composition or formulation is a combination or mixture of more than one species, component or compound, which can include adhesive monomers, oligomers, and polymers along with other materials.

A "sealant" or "sealant composition" refers to a composition which may be applied to one or more surfaces to form a protective barrier, for example to prevent ingress or egress of solid, liquid or gaseous material or alternatively to allow selective permeability through the barrier to gas and liquid. In particular, it may provide a seal between surfaces.

A "film composition" refers to a mixture of chemical components that will cure and form a thin flexible strip of material, i.e., a "film".

An "elastomer" refers to a polymeric composition that has high elongation and flexibility or elasticity. Elastomers may be made from natural rubber, polyurethanes, polybutadiene, neoprene, and silicone.

A "casting" or "casting composition" refers to a mixture of liquid chemical components which is usually poured into a mold containing a hollow cavity of the desired shape, and then allowed to solidify.

A "foam" is produced by mixing a polyol and an isocyanate along with an amine or organometallic catalyst and a combination of water and a hydrofluorocarbon blowing agent.

A "composite" or "composite composition" refers to a material made from one or more polymers, containing at least one other type of material (e.g., a fiber) which retains its identity while contributing desirable properties to the composite. A composite has different properties from those of the individual polymers/materials which make it up.

The terms "cured," "cured composition" or "cured compound" refers to components and mixtures obtained from reactive curable original compound(s) or mixture(s) thereof which have undergone chemical and/or physical changes such that the original compound(s) or mixture(s) is(are) transformed into a solid, substantially non-flowing material. A typical curing process may involve crosslinking.

The term "curable" means that an original compound(s) or composition material(s) can be transformed into a solid, substantially non-flowing material by means of chemical reaction, crosslinking, radiation crosslinking, or the like. Thus, compositions of the invention are curable, but unless otherwise specified, the original compound(s) or composition material(s) is(are) not cured.

As indicated, the coating compositions of the present invention comprise a polyisocyanate. As used herein, the term "polyisocyanate" refers to compounds comprising at least two unreacted isocyanate groups, such as three or more unreacted isocyanate groups. The polyisocyanate may comprise diisocyanates such as linear aliphatic polyisocyanates, cycloaliphatic polyisocyanates and alkaryl polyisocyanates.

A "polyisocyanurate" resin is a resin having an isocyanurate ring structure obtained by trimerization of polyisocyanate. Polyisocyanurate resins are prepared by reaction of a polyisocyanate in the presence of a catalyst such as an isocyanuration (trimerization) catalyst. A "polyisocyanurate" means any molecule having a plurality of isocyanurate structural units, e.g., at least ten isocyanurate structural units. A molecule having a single isocyanurate structural unit is referred to as an "isocyanurate".

A "prepolymer" means an oligomeric compound having functional groups which are involved in the final construction of polymers. In particular, it comprises, as is usual in polyurethane chemistry, compounds which contain at least one diisocyanate unit and at least one diol unit and are polymerizable further via the functional groups of these units.

A "composite polyisocyanurate material" means a composite material wherein the polymeric matrix material is a polymer containing polyisocyanurate. The polymeric matrix material may also comprise predominantly, or entirely, a polyisocyanurate. A polymeric matrix material composed of blends of polyisocyanurates and other plastics is likewise encompassed by the term "composite polyisocyanurate material".

Suitable aliphatic diisocyanates and prepolymers and polyisocyanates for use in the polyurethane-forming reaction mixtures of the present invention are clear and colorless and have a viscosity at 25° C. of less than 5000 centipoise. Examples of such aliphatic polyisocyanates include those represented by the formula, $$Q(NCO)_n$$

wherein n is a number from 2-5, in some embodiments from 2-3, and Q is an aliphatic hydrocarbon group containing 2-12, in certain embodiments from 4-6, carbon atoms or a cycloaliphatic hydrocarbon group containing 4-6, in selected embodiments from 5-6, carbon atoms.

Examples of the organic diisocyanates which are suitable for use in the present invention include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and 1,4-diisocyanate, 1-isocyanato-2-isocyanato-methyl cyclopentane, 1-isocyanato-3-isocyanatomethyl-3,5,5-trimethyl cyclohexane (isophorone diisocyanate or IPDI), bis-(4-isocyanatocyclohexyl)methane, 1,3- and 1,4-bis(isocyanatomethyl)-cyclohexane, bis-(4-isocyanato-3-methyl-cyclohexyl)-methane, 1-isocyanato-1-methyl-4(3)-isocyanato-methyl cyclohexane, diphenylmethane diisocyanate (MDI), dicyclohexylmethane-4,4-diisocyanate ($H_{12}$MDI), xylylene diisocyanate (XDI), pentane diisocyanate (PDI), and, isomers of any of these; or combinations of any of these. Mixtures of diisocyanates may also be used. Preferred diisocyanates include 1,6-hexamethylene diisocyanate, isophorone diisocyanate, and bis(4-isocyanatocyclohexyl)-methane because they are readily available and yield relatively low viscosity polyisocyanate formulations.

Isocyanate-terminated prepolymers may also be employed in the present invention. as those skilled in the art are aware, prepolymers may be prepared by reacting an excess of organic polyisocyanate or mixtures thereof with a minor amount of an active hydrogen-containing compound as determined by the well-known Zerewitinoff test, as described by Kohler in "Journal of the American Chemical Society," 49, 3181(1927). These compounds and their methods of preparation are well known to those skilled in the art. The use of any one specific active hydrogen compound is not critical; any such compound can be employed in the practice of the present invention. In certain embodiments, the polyisocyanate comprises blend based on a hexamethylene diisocyanate trimer and a dicyclohexylmethane-4,4-diisocyanate prepolymer.

The polyisocyanurates of the invention are obtainable by catalytic trimerization by the process of the invention. "Catalytic" as used herein means in the presence of a suitable trimerization catalyst. The invention extends formulation pot life at room temperature while maintaining the same curing efficiency by introduction of a small amount of an acid, in particular, a thermally decomposable acid into the formulation. The acid can be an organic acid or an acid precursor that is soluble in polyisocyanate and that acts as an inhibitor for the trimerization catalyst at room temperature. Catalysts for the formation of polyisocyanurates (i.e., trimerization catalysts) include metal-type catalysts, such as alkali metal carboxylates, metal alcoholates, metal phenolates and metal hydroxides, tertiary amines, quaternary ammonium salts, tertiary phosphines and phosphorus onium salts. These trimerization catalysts are often used in combination with other catalysts which promote the reaction of isocyanates with water and/or polyols to obtain a synergistic effect. Suitable catalysts include binary or ternary blends of tertiary amine, such as pentamethyldiethylenetriamine, dimethylcyclohexylamine or dimethylethanolamine and potassium organo-salts such as potassium octoate or potassium acetate.

Suitable trimerization catalysts for the processes of the invention are in principle all compounds which comprise at least one quaternary ammonium and/or metal salt and which are suitable for accelerating the trimerization of isocyanate groups to isocyanurate structures. According to the invention, the trimerization catalyst comprises at least one quaternary ammonium and/or metal salt as catalyst. In the context of the invention, a "quaternary ammonium" is understood to mean a compound of the formula $NR_4^+$ where the "R" radical comprises organic radicals, especially alkyl or aryl radicals. Preferably, the quaternary ammonium is a compound of the formula $NR_4^+$ where each of the R radicals is independently a linear or branched alkyl radical having 1 to 5 carbon atoms.

Suitable trimerization catalysts comprise, as metal salt, carboxylates and alkoxides of metals. In various embodiments of the invention, the trimerization catalysts include metal salts of aliphatic carboxylic acids having 1 to 20 and in some embodiments, 1 to 10 carbon atoms, for example metal salts of formic acid, acetic acid, propionic acid, butyric acid, valeric acid, caproic acid, enanthic acid, caprylic acid, pelargonic acid and capric acid. In selected embodiments, the catalysts include acetate salts.

In some embodiments of the process of the invention, the trimerization catalyst comprises, as metal component, an element selected from the group consisting of alkali metals, alkaline earth metals, tin, zirconium, zinc, iron and titanium.

In a various embodiments of the process of the invention, the trimerization catalyst comprises, as metal component, an alkali metal or alkaline earth metal. In certain embodiments, the metal components are sodium and potassium.

In an embodiment of the process of the invention, the trimerization catalyst comprises, as metal component, an alkaline alkali metal salt or alkaline earth metal salt which, as a saturated aqueous solution, has a pH of greater than 7, in certain embodiments greater than 8, and in selected embodiments, greater than 9 (measured with litmus paper) at 23° C. Particular preference is given to sodium salts and potassium salts.

In other embodiments, the metal salt is an alkali metal acetate or octoate or alkaline earth metal acetate or octoate, most preferably an alkali metal acetate. In various embodiments of the invention, tin octoate is preferred.

In certain embodiments, the trimerization catalyst also includes a polyether carrier solvent (40-95) wt %. Polyethers are selected from the group consisting of crown ethers, polyethylene glycols and polypropylene glycols. It has been found to be of particular practical relevance in the process of the invention to use a trimerization catalyst comprising, as polyether, a polyethylene glycol or a crown ether, more preferably 18-crown-6 or 15-crown-S. In some embodiments, the trimerization catalyst may comprise a polyethylene glycol having a number-average molecular weight of 100 to 1000 g/mol, in certain embodiments, of 106 to 1000 g/mol, in selected embodiments, 200 g/mol to 800 g/mol, especially 300 g/mol to 500 g/mol and most especially 350 g/mol to 450 g/mol. The term "polyethylene glycol" as used herein includes diethylene glycol.

Preferred trimerization catalysts for the process of the invention include potassium acetate or potassium octoate as alkali metal salt and polyethylene glycols as polyether, especially potassium acetate and polyethylene glycol having a number-average molecular weight of 400 g/mol.

The trimerization catalysts can be used in the process of the invention either individually or in the form of any desired mixtures with one another. In various embodiments of the invention, the trimerization catalyst is used in in amounts such that the molar ratio of acid to catalyst is from 0.1 to 10. In certain embodiments, the catalyst is used in amounts such that the molar ratio of acid to catalyst is from 0.2 to 5.

Suitable catalyst solvents are, for example, solvents that are inert toward isocyanate groups, for example hexane, toluene, xylene, chlorobenzene, ethyl acetate, butyl acetate, diethylene glycol dimethyl ether, dipropylene glycol dimethyl ether, ethylene glycol monomethyl or monoethyl ether acetate, diethylene glycol ethyl and butyl ether acetate, propylene glycol monomethyl ether acetate, 1-methoxy-2-propyl acetate, 3-methoxy-n-butyl acetate, propylene glycol diacetate, acetone, methyl ethyl ketone, methyl isobutyl ketone, cyclohexanone, lactones, such as β-propiolactone, γ-butyrolactone, ε-caprolactone and ε-methylcaprolactone, but also solvents such as N-methylpyrrolidone and N-methylcaprolactam, 1,2-propylene carbonate, methylene chloride, dimethyl sulphoxide, triethyl phosphate or any desired mixtures of such solvents.

In principle, an thermally decomposable acids may be used in the invention. Particularly useful thermally decomposable acids include carboxylic acids, such as carbamic acids, i.e., RHNCOOH or RR'NCOOH or $R(HNCOOH)_n$ wherein R and R' are organic groups in mono-isocyanate, di-isocyanate, polyisocyanates, or isocyanate prepolymers. Such organic groups include, but are not limited to, hexamethyl, and cyclohexylmethyl. Other thermally decomposable acids include thiocarbamic acids. Particularly preferred are those thermally decomposable acids that undergo fast decomposition at low temperatures so as to lower the curing temperature of the formulation, such as β-substituted organic acids. Thiocarbamic acid may prove useful in the invention as the thermally decomposable acid.

In the invention, pultrusion of polyisocyanurate systems with fiber reinforced composites may be performed in a closed injection box or preferably in an open bath process, in which reinforcement material in the form of fibers, mat or roving is pulled continuously through an open bath of polyisocyanurate to produce an impregnated reinforcement. The impregnated reinforcement is pulled through form plates to remove excess resin, and then through a curing die to cure the resin and yield a finished product. The pultrusion apparatus may optionally contain a plurality of curing dies, or zones. Different curing zones may be set at different temperatures, if desired, but all the zones of the curing die will be higher in temperature than the impregnation bath. The impregnation bath is set at a temperature that provides for substantially no reaction (polymerization) between the polyisocyanurate component and the polyisocyanate-reactive component in the polyisocyanurate-forming formulation before the fibrous reinforcing structure, enters the first curing die (or zone).

A long fiber based reinforcing material is necessary to provide mechanical strength to the pultruded composite of the invention, and to allow the transmission of the pulling force in the process. Fibers should be at least long enough to pass though both the impregnation and curing dies and attach to a source of tension. In various embodiments of the invention, the fibrous reinforcing material is made of any fibrous material or materials that can provide long fibers capable of being at least partially wetted by the polyisocyanurate formulation during impregnation. The fibrous reinforcing material may be single strands, braided strands, woven or non-woven mat structures and combinations thereof. Mats or veils made of long fibers may be used, in single ply or multi-ply structures.

Suitable fibrous materials are known in the pultrusion art, include, but are not limited to, glass fibers, glass mats, carbon fibers, polyester fibers, natural fibers, aramid fibers, nylon fibers, basalt fibers and combinations thereof. In some embodiments of the invention the fibrous reinforcing materials are long glass fibers. In various embodiments, the fibers and/or fibrous reinforcing structures may be formed continuously from one or more reels feeding into the pultrusion apparatus and attached to a source of pulling force at the outlet side of the curing die. In certain embodiments, the reinforcing fibers may optionally be pre-treated with sizing agents or adhesion promoters known to those skilled in the art.

The weight percentage of the long fiber reinforcement in the pultruded composites may vary considerably, depending on the end use application intended for the composite articles. In various embodiments of the invention, reinforcement loadings may be from 30% to 95% by weight, in some embodiments from 40% to 90% by weight of the final composite, in certain other embodiments from 60 to 90% by weight, and in various other embodiments from 70% to 90% by weight, based on the weight of the final composite. The long fiber reinforcement may be present in the pultruded composites in an amount ranging between any combination of these values, inclusive of the recited values.

In the process of producing the polyisocyanurate pultrusion composite, the polyisocyanurate component and the isocyanate-reactive component may be the only components fed into the process. The polyisocyanurate component or the isocyanate-reactive component may be premixed with any optional additives. However, it is to be understood that the optional additives that are not themselves polyfunctional isocyanate-reactive materials are to be considered (counted) as entities separate from the isocyanate-reactive component, even when mixed therewith. Likewise, if the optional additives, or any part thereof, are premixed with the polyisocyanurate component, these are to be considered as entities separate from the polyisocyanurate component, except in the case where they are themselves polyfunctional isocyanate species.

The pultrusion formulation may contain other optional additives, if desired. Examples of additional optional additives include particulate or short fiber fillers, internal mold release agents, fire retardants, smoke suppressants, dyes, pigments, antistatic agents, antioxidants, UV stabilizers, minor amounts of viscosity reducing inert diluents, combinations of these, and any other known additives from the art. In some embodiments of the present invention, the additives or portions thereof may be provided to the fibers, such as by coating the fibers with the additive.

Internal mold release agents may be nonionic surfactants containing perfluoroalkyl or polysiloxane units that are known as mold release agents; quaternary alkylammonium salts, for example trimethylethylammonium chloride, trimethylstearylammonium chloride, dimethylethylcetylammonium chloride, triethyldodecylammonium chloride, trioctylmethylammonium chloride and diethylcyclohexyldodecylammonium chloride; acidic monoalkyl and dialkyl phosphates and trialkyl phosphates having 2 to 18 carbon atoms in the alkyl radical, such as, ethyl phosphate, diethyl phosphate, isopropyl phosphate, diisopropyl phosphate, butyl phosphate, dibutyl phosphate, octyl phosphate, dioctyl phosphate, isodecyl phosphate, diisodecyl phosphate, dodecyl phosphate, didodecyl phosphate, tridecanol phosphate, bis(tridecanol) phosphate, stearyl phosphate, distearyl phosphate; waxes such as beeswax, montan wax or polyethylene oligomers; metal salts and esters of oily and fatty acids, such as barium stearate, calcium stearate, zinc stearate, glycerol stearate and glycerol laurate, esters of aliphatic branched and unbranched alcohols having 4 to 36 carbon atoms in the alkyl radical; and any desired mixtures of such mold release agents.

In selected embodiments, the mold release agents are the fatty acid esters and salts thereof mentioned, and also acidic mono- and dialkyl phosphates mentioned, most preferably those having 8 to 36 carbon atoms in the alkyl radical.

Internal mold release agents are used in the process according to various embodiments of the invention, if appropriate, in amounts of 0.01% to 15.0% by weight, in certain embodiments of 0.02% to 10.0% by weight, in selected embodiments of 0.05% to 7.0% by weight, in very select embodiments of 0.1% to 5% by weight and in particular embodiments of from 0.3% to 3% by weight, calculated as the total amount of internal mold release agent used, based on the total weight of the polyisocyanate composition.

It has been found that the addition of fatty acid salts, especially stearate salts, to the polyisocyanate composition allows the tensile forces in pultrusion to be considerably lowered under otherwise identical conditions. At the same time, there is a distinct rise in surface quality of the pultrudates, the surface becomes smoother and abrasion at the heating mold outlet is distinctly reduced. Moreover, because of the lower friction, the pultrusion rate (for a given tensile force) can be increased, which makes the process more efficient.

Consequently, in various embodiments of the invention, stearate salts, such as zinc stearate or calcium stearate, are used as the demolding agent, with preference being given to zinc stearate. These mold release agents are used in various embodiment in amounts of less than 10% by weight, in certain embodiments of less than 5% by weight, in selected embodiments of less than 2% by weight and in particular embodiments of less than 1% by weight, based on the total weight of the polyisocyanate composition. In various embodiments, the polyisocyanate composition contains at least 0.001% by weight of stearate salts, in certain embodiments of greater than 0.01% by weight, in selected embodiments of greater than 0.1% by weight and in particular embodiments greater than 0.25% by weight, based on the total weight thereof.

In certain embodiment of the invention, stearate salts, such as zinc stearate and/or calcium stearate and or zinc stearate, are used in combination with one or more further internal mold release agents in the pultrusion. The further mold release agents may be phosphoric esters, fatty acids, fatty acid esters or amides, siloxane derivatives, long-chain alcohols, for example isotridecanol, waxes and montan waxes, and any desired mixtures thereof. The mixing ratio between the stearate salt and the further mold release agents can be optimized arbitrarily by the person skilled in the art according to the profile form and the pultrusion conditions, but is in various embodiments less than 90% by weight, in certain embodiments, less than 50% by weight, in selected embodiments less than 30% by weight and in very select embodiments, between 2% and 25% by weight of stearate salt, based on the amount of all internal mold release agents used. The total content of all internal mold release agents is as set out above.

Other optional additives for use in pultrusion include moisture scavengers, such as molecular sieves; defoamers, such as polydimethylsiloxanes; coupling agents, such as the mono-oxirane or organo-amine functional trialkoxysilanes; combinations of these and the like. The coupling agents are included for improving the bonding of the matrix resin to the fiber reinforcement. Fine particulate fillers, such as clays and fine silicas, may be used at thixotropic additives. Such particulate fillers may also serve as extenders to reduce resin usage. Fire retardants are sometimes desirable as additives in pultruded composites. Examples of suitable fire retardant types include, but are not limited to, triaryl phosphates; trialkyl phophates, especially those bearing halogens; melamine (as filler); melamine resins (in minor amounts); halogenated paraffins and combinations thereof.

The pultrusion composite of the invention may find use in or as a variety of products, including, but not limited to, wind turbine blades, yacht shells, window frames, door frames, ladder frames, telegraph pole cross arms, tent poles, solar cell frames, solar cell backsheets, radomes, highway guard rails, floor boards, pipes, telegraph poles, auto trunks, luggage holders, engine covers, golf clubs, tennis poles, badminton poles, bicycle frames, surfboards, and snowboards.

EXAMPLES

The non-limiting and non-exhaustive examples that follow are intended to further describe various non-limiting and non-exhaustive embodiments without restricting the scope of the embodiments described in this specification. All quantities given in "parts" and "percents" are understood to be by weight, unless otherwise indicated.

The following materials were used in preparation of the Examples:

| | |
|---|---|
| ACID A | acetic acid, commercially available from Sigma-Aldrich; |
| ACID PRECURSOR A | benzoyl chloride, commercially available from Sigma-Aldrich: |
| ISOCYANATE A | a low-viscosity hexamethylene diisocyanate (HDI) trimer; NCO content 23.0% ± 0.5; |
| ISOCYANATE B | a pentamethylene diisocyanate (PDI) trimer (NCO functionality >3), NCO content 21.5% by weight; |
| ISOCYANATE C | a dicyclohexylmethane-4,4-diisocyanate prepolymer with polypropylene glycol having an NCO group content of 26.40%; |
| ISOCYANATE D | 1:1 blend of ISOCYANATE A and ISOCYANATE C; |
| CATALYST A | potassium acetate (5%) in PEG-400; |
| CATALYST B | a 70% by weight solution of potassium octoate in diethylene glycol; |
| CATALYST C | N, N, N'Alimethylaminoethyl-ethanolamine; and |
| ADDITIVE A | a zinc stearate dispersed in fatty acid ester as internal mold release agent. |

The experiments summarized in Table I demonstrate that using a non-decomposable acid or precursor can stabilize formulation viscosity, but will also slow the reactivity. The resin formulations include 96 wt % isocyanate A and catalyst A. The viscosity of the formulation was measured within 10 minutes of preparing the samples and again after two hours. The cure time of these samples (time for the sample to completely solidify) was measured on a hot plate with a set surface temperature of 180° C.

TABLE I

| Run | Acid loading | Acid used | Initial viscosity (cps) | 2 hour viscosity (cps) | Curing speed (seconds) |
|---|---|---|---|---|---|
| I-1 | 0.1 | A | 1871 | 2067 | 477 |
| I-2 | 0.01 | A | 1945 | 3183 | 144 |
| I-9 | 0.1 | Precursor A | 1669 | 1907 | 632 |
| I-10 | 0.01 | Precursor A | 1944 | 2842 | 166 |
| I-11 | 0 | — | 2039 | 9444 | 123 |

A thermally decomposable acid, such as N-substituted carbamic acid, can be created by in-situ reaction between water and isocyanate. The carbamic acid is thermally unstable and quickly decomposed at low temperature to form an amine and $CO_2$, which is released as a gas.

TABLE II

| Example | II-1 | II-2 | II-3 | II-4 | II-5 | II-6 |
|---|---|---|---|---|---|---|
| ISOCYANATE A (parts) | 96 | 96 | 96 | 96 | — | — |
| ISOCYANATE B (parts) | — | — | — | — | 96 | 96 |
| CATALYST A (parts) | 4.0 | 4.0 | 4.0 | 4.0 | 4 | 4 |
| Water (ppm) | 30 | 130 | 430 | 1030 | 30 | 130 |
| ADDITIVE A (parts) | 2.5 | 2.5 | 2.5 | 2.5 | — | — |
| Gel time | 8 hours | 4 days | 5 days | 10 days | 2 hours | 2 days |
| Initial viscosity (cps) | 2135 | 1270 | 2229 | 1835 | — | — |
| 2-hour viscosity (cps) | 3621 | 2156 | 2393 | 2215 | — | — |
| 4.5-hour viscosity (cps) | 7310 | 2344 | 2551 | 2523 | — | — |
| Resin cure speed @ 180° C. on hot plate (s) | 127 | 157 | 150 | 163 | — | — |

Table II demonstrates that carbamic acid effectively stabilizes formulation viscosity, and thus extends the pot life from hours to days, while not significantly effecting reactivity.

For different catalysts, the formulation pot life can be extended over 2 weeks.

TABLE III

| | | Viscosity (cps) | | | | | | | |
|---|---|---|---|---|---|---|---|---|---|
| Sample | Composition | | Day 1 | Day 2 | Day 3 | Day 5 | Day 8 | Day 10 | Day 12 | Day 15 |
| III-1 | ISOCYANATE D | 96.17 parts | 624 | 722 | 764 | 803 | 834 | 880 | 955 | 1076 |
| | ADDITIVE A | 2.5 parts | | | | | | | | |
| | CATALYST B | 1.33 parts | | | | | | | | |
| | (400 ppm water)* | | | | | | | | | |
| III-2 | ISOCYANATE A | 96.17 parts | 1160 | 1406 | 1444 | 1454 | 1554 | 1477 | 1579 | 1852 |
| | ADDITIVE A | 2.5 parts | | | | | | | | |
| | CATALYST B | 1.33 parts | | | | | | | | |
| | (400 ppm water) | | | | | | | | | |
| III-3 | ISOCYANATE A | 97.25 parts | 1147 | 1209 | 1219 | 1244 | 1292 | 1409 | 1498 | 1661 |
| | ADDITIVE A | 2.5 parts | | | | | | | | |
| | CATALYST C | 0.25 parts | | | | | | | | |
| | (100 ppm water) | | | | | | | | | |

TABLE III-continued

| Sample | Composition | | Viscosity (cps) | | | | | | | |
|---|---|---|---|---|---|---|---|---|---|---|
| | | | Day 1 | Day 2 | Day 3 | Day 5 | Day 8 | Day 10 | Day 12 | Day 15 |
| III-4 (comparative) | ISOCYANATE A ADDITIVE A CATALYST A | 93.5 parts 2.5 parts 4.0 parts | 1465 | gel | — | — | — | — | — | — |

*residual water from commercial catalyst

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth herein. Such embodiments may be obtained, for example, by combining, modifying, or reorganizing any of the disclosed steps, components, elements, features, aspects, characteristics, limitations, and the like, of the various non-limiting embodiments described in this specification. In this manner, Applicant reserves the right to amend the claims during prosecution to add features as variously described in this specification, and such amendments comply with the requirements of 35 U.S.C. § 112(a), and 35 U.S.C. § 132(a).

Various aspects of the subject matter described herein are set out in the following numbered clauses:

Clause 1. A process for producing a polyisocyanurate comprising: trimerizing an aliphatic polyisocyanate with a trimerization catalyst in the presence of a thermally decomposable acid at a molar ratio of acid to catalyst of from 0.1 to 10, wherein the polyisocyanurate has a greater pot life than the pot life of the polyisocyanurate not containing the thermally decomposable acid.

Clause 2. The process according to Clause 1, wherein the thermally decomposable acid is present at a molar ratio of acid to catalyst is from 0.2 to 5.

Clause 3. The process according to one of Clauses 1 and 2, wherein the thermally decomposable acid has a formula selected from the group consisting of RHNCOOH, RR'NCOOH, and R(HNCOOH)$_n$, wherein R and R' are organic groups.

Clause 4. The process according to any one of Clauses 1 to 3, wherein the thermally decomposable acid is an N-substituted (thio)carbamic acid.

Clause 5. The process according to any one of Clauses 1 to 4, wherein the thermally decomposable acid is the reaction product of added water and the polyisocyanate.

Clause 6. The process according to any one of Clauses 1 to 5, wherein the trimerization catalyst is an alkali metal salt or an alkaline earth metal salt.

Clause 7. The process according to Clause 6, wherein the salt is selected from the group consisting of alkoxides, amides, phenoxides, carbonates, hydrogencarbonates, hydroxides, cyanides, isocyanides, thiocyanides, sulphides, sulphites, sulphinates, phosphites, phosphinates, phosphonates, phosphates, and fluorides.

Clause 8. The process according to one of Clauses 6 and 7, wherein the metal is selected from the group consisting of manganese, iron, cobalt, nickel, copper, zinc, zirconium, cerium, tin, titanium, hafnium, lead, lithium, sodium, potassium, magnesium, calcium, strontium, and barium.

Clause 9. The process according to any one of Clauses 1 to 8, wherein the aliphatic polyisocyanate is selected from the group consisting of 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3-diisocyanate, cyclohexane-1,4-diisocyanate, 1-isocyanato-2-isocyanato-methyl cyclopentane, 1-isocyanato-3-isocyanatomethyl-3,5,5-trimethyl cyclohexane, bis-(4-isocyanatocyclohexyl)methane, 1,3-bis(isocyanatomethyl)-cyclohexane, 1,4-bis(isocyanatomethyl)-cyclohexane, bis-(4-isocyanato-3-methyl-cyclohexyl)-methane, 1-isocyanato-1-methyl-4(3)-isocyanato-methyl cyclohexane, diphenylmethane diisocyanate, dicyclohexyl-methane-4,4-diisocyanate, pentane diisocyanate, isomers of any of these, and combinations of any of these.

Clause 10. The process according to any one of Clauses 1 to 9, wherein the aliphatic polyisocyanate is a trimer or prepolymer based on one selected from the group consisting of 1,6-hexamethylene diisocyanate, 1-isocyanato-3-isocyanatomethyl-3,5,5-trimethyl cyclohexane, and dicyclohexyl-methane-4,4-diisocyanate.

Clause 11. One of a coating, an adhesive, a sealant, a film, an elastomer, a casting, a foam, and a composite comprising the polyisocyanurate produced according the process of any one of Clauses 1 to 10.

Clause 12. A pultrusion composite formulation comprising: a fiber; and a polyisocyanurate formulation, wherein the polyisocyanate formulation comprises an aliphatic polyisocyanate which is trimerized with a trimerization catalyst in the presence of a thermally decomposable acid at a molar ratio of acid to catalyst of from 0.1 to 10, and wherein the polyisocyanurate has a greater pot life than the pot life of the polyisocyanurate not containing the thermally decomposable acid.

Clause 13. The pultrusion composite formulation according to Clause 12, wherein the thermally decomposable acid is present at a molar ratio of acid to catalyst is from 0.2 to 5.

Clause 14. The pultrusion composite formulation according to one of Clauses 12 and 13, wherein the thermally decomposable acid is an N-substituted (thio)carbamic acid.

Clause 15. The pultrusion composite formulation according to one of Clauses 12 and 13, wherein the thermally decomposable acid has a formula selected from the group consisting of RHNCOOH, RR'NCOOH, and R(HNCOOH)$_n$, wherein R and R' are organic groups.

Clause 16. The pultrusion composite formulation according to any one of Clauses 12 to 15, wherein the thermally decomposable acid is the reaction product of added water and the polyisocyanate.

Clause 17. The pultrusion composite formulation according to any one of Clauses 12 to 16, wherein the trimerization catalyst is an alkali metal salt or an alkaline earth metal salt.

Clause 18. The pultrusion composite formulation according to Clause 17, wherein the salt is selected from the group consisting of alkoxides, amides, phenoxides, carbonates, hydrogencarbonates, hydroxides, cyanides, isocyanides, thiocyanides, sulphides, sulphites, sulphinates, phosphites, phosphinates, phosphonates, phosphates, and fluorides.

Clause 19. The pultrusion composite formulation according to one of Clauses 17 and 18, wherein the metal is selected from the group consisting of manganese, iron, cobalt, nickel, copper, zinc, zirconium, cerium, tin, titanium, hafnium, lead, lithium, sodium, potassium, magnesium, calcium, strontium, and barium.

Clause 20. The pultrusion composite formulation according to any one of Clauses 12 to 19, wherein the aliphatic polyisocyanate is selected from the group consisting of 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3-diisocyanate, cyclohexane-1,4-diisocyanate, 1-isocyanato-2-isocyanato-methyl cyclopentane, 1-isocyanato-3-isocyanatomethyl-3,5,5-trimethyl cyclohexane, bis-(4-isocyanatocyclohexyl)methane, 1,3-bis(isocyanatomethyl)-cyclohexane, 1,4-bis(isocyanatomethyl)-cyclohexane, bis-(4-isocyanato-3-methyl-cyclohexyl)-methane, 1-isocyanato-1-methyl-4(3)-isocyanato-methyl cyclohexane, diphenylmethane diisocyanate, dicyclohexylmethane-4,4-diisocyanate, pentane diisocyanate, isomers of any of these, and combinations of any of these.

Clause 21. The pultrusion composite formulation according to any one of Clauses 12 to 20, wherein the aliphatic polyisocyanate is a trimer or prepolymer based on one selected from the group consisting of 1,6-hexamethylene diisocyanate, 1-isocyanato-3-isocyanatomethyl-3,5,5-trimethyl cyclohexane, and dicyclohexylmethane-4,4-diisocyanate.

Clause 22. The pultrusion composite formulation according to any one of Clauses 12 to 21, wherein the fiber is selected from the group consisting of glass fibers, glass mats, carbon fibers, polyester fibers, natural fibers, aramid fibers, nylon fibers, basalt fibers, and combinations thereof.

Clause 23. A pultrusion composite comprising a reaction product of the pultrusion composite formulation according to any one of Clauses 12 to 22 which is pultruded and cured to form the composite.

Clause 24. The pultrusion composite according to Clause 23, wherein the composite is one selected from the group consisting of a wind turbine blade, a yacht shell, a window frame, a door frame, a ladder frame, a telegraph pole cross arm, a tent pole, a solar cell frame, a solar cell backsheet, a radome, a highway guard rail, a floor board, a pipe, a telegraph pole, an auto trunk, a luggage holder, an engine cover, a golf club, a tennis pole, a badminton pole, a bicycle frame, a surfboard, and a snowboard.

What is claimed is:

1. A process for producing a polyisocyanurate comprising:
   trimerizing an aliphatic polyisocyanate with a trimerization catalyst in the presence of a thermally decomposable acid at a molar ratio of acid to catalyst of from 0.1 to 10, wherein the polyisocyanurate has a greater pot life than the pot life of the polyisocyanurate not containing the thermally decomposable acid, and wherein the thermally decomposable acid has a formula selected from the group consisting of RHNCOOH, RR'NCOOH, and R(HNCOOH)$_n$, wherein R and R' are organic groups and n is a number from 2-5.

2. The process according to claim 1, wherein the thermally decomposable acid is present at a molar ratio of acid to catalyst of from 0.2 to 5.

3. The process according to claim 1, wherein the thermally decomposable acid is an N-substituted (thio)carbamic acid.

4. The process according to claim 1, wherein the thermally decomposable acid is the reaction product of added water and the polyisocyanate.

5. The process according to claim 1, wherein the trimerization catalyst is an alkali metal salt or an alkaline earth metal salt.

6. The process according to claim 5, wherein the metal is selected from the group consisting of manganese, iron, cobalt, nickel, copper, zinc, zirconium, cerium, tin, titanium, hafnium, lead, lithium, sodium, potassium, magnesium, calcium, strontium, and barium, and wherein the salt is selected from the group consisting of alkoxides, amides, phenoxides, carbonates, hydrogencarbonates, hydroxides, cyanides, isocyanides, thiocyanides, sulphides, sulphites, sulphinates, phosphites, phosphinates, phosphonates, phosphates, and fluorides.

7. The process according to claim 1, wherein the aliphatic polyisocyanate is selected from the group consisting of 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3-diisocyanate, cyclohexane-1,4-diisocyanate, 1-isocyanato-2-isocyanato-methyl cyclopentane, 1-isocyanato-3-isocyanatomethyl-3,5,5-trimethyl cyclohexane, bis-(4-isocyanatocyclohexyl)methane, 1,3-bis(isocyanatomethyl)-cyclohexane, 1,4-bis(isocyanatomethyl)-cyclohexane, bis-(4-isocyanato-3-methyl-cyclohexyl)-methane, 1-isocyanato-1-methyl-4(3)-isocyanato-methyl cyclohexane, diphenylmethane diisocyanate, dicyclohexylmethane-4,4-diisocyanate, pentane diisocyanate, isomers of any of these, and combinations of any of these.

8. The process according to claim 1, wherein the aliphatic polyisocyanate is a trimer or prepolymer based on one selected from the group consisting of 1,6-hexamethylene diisocyanate, 1-isocyanato-3-isocyanatomethyl-3,5,5-trimethyl cyclohexane, and dicyclohexylmethane-4,4-diisocyanate.

9. A pultrusion composite formulation comprising:
   a fiber; and
   a polyisocyanurate formulation,
   wherein the polyisocyanate formulation comprises an aliphatic polyisocyanate which is trimerized with a trimerization catalyst in the presence of a thermally decomposable acid at a molar ratio of acid to catalyst of from 0.1 to 10, and wherein the polyisocyanurate has a greater pot life than the pot life of the polyisocyanurate not containing the thermally decomposable acid, and wherein the thermally decomposable acid has a formula selected from the group consisting of RHNCOOH, RR'NCOOH, and R(HNCOOH)$_n$, wherein R and R' are organic groups and n is a number from 2 to 5.

10. The pultrusion composite formulation according to claim 9, wherein the thermally decomposable acid is present at a molar ratio of acid to catalyst is from 0.2 to 5.

11. The pultrusion composite formulation according to claim 9, wherein the thermally decomposable acid is the reaction product of added water and the polyisocyanate.

12. The pultrusion composite formulation according to claim 9, wherein the trimerization catalyst is an alkali metal salt or an alkaline earth metal salt.

13. The pultrusion composite formulation according to claim 12, wherein the metal is selected from the group consisting of manganese, iron, cobalt, nickel, copper, zinc, zirconium, cerium, tin, titanium, hafnium, lead, lithium, sodium, potassium, magnesium, calcium, strontium, and barium, and wherein the salt is selected from the group consisting of alkoxides, amides, phenoxides, carbonates, hydrogencarbonates, hydroxides, cyanides, isocyanides, thiocyanides, sulphides, sulphites, sulphinates, phosphites, phosphinates, phosphonates, phosphates, and fluorides.

14. The pultrusion composite formulation according to claim 9, wherein the aliphatic polyisocyanate is selected from the group consisting of 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3-diisocyanate, cyclohexane-1,4-diisocyanate, 1-isocyanato-2-isocyanato-methyl cyclopentane, 1-isocyanato-3-isocyanatomethyl-3,5,5-trimethyl cyclohexane, bis-(4-isocyanatocyclohexyl)methane, 1,3-bis(isocyanatomethyl)-cyclohexane, 1,4-bis(isocyanatomethyl)-cyclohexane, bis-(4-isocyanato-3-methyl-cyclohexyl)-methane, 1-isocyanato-1-methyl-4(3)-isocyanatomethyl cyclohexane, diphenylmethane diisocyanate, dicyclohexylmethane-4,4-diisocyanate, pentane diisocyanate, isomers of any of these, and combinations of any of these.

15. The pultrusion composite formulation according to claim 9, wherein the aliphatic polyisocyanate is a trimer or prepolymer based on one selected from the group consisting of 1,6-hexamethylene diisocyanate, 1-isocyanato-3-isocyanatomethyl-3,5,5-trimethyl cyclohexane, and dicyclohexylmethane-4,4-diisocyanate.

16. The pultrusion composite formulation according to claim 9, wherein the fiber is selected from the group consisting of glass fibers, glass mats, carbon fibers, polyester fibers, natural fibers, aramid fibers, nylon fibers, basalt fibers, and combinations thereof.

17. A pultrusion composite comprising a reaction product of the pultrusion composite formulation according to claim 9 which is pultruded and cured to form the composite.

18. The pultrusion composite according to claim 17, wherein the composite is one selected from the group consisting of a wind turbine blade, a yacht shell, a window frame, a door frame, a ladder frame, a telegraph pole cross arm, a tent pole, a solar cell frame, a solar cell backsheet, a radome, a highway guard rail, a floor board, a pipe, a telegraph pole, an auto trunk, a luggage holder, an engine cover, a golf club, a tennis pole, a badminton pole, a bicycle frame, a surfboard, and a snowboard.

* * * * *